United States Patent
Mozo et al.

(10) Patent No.: US 11,459,251 B2
(45) Date of Patent: Oct. 4, 2022

(54) METHOD AND DEVICE FOR TREATING WASTEWATER

(71) Applicant: SUEZ GROUPE, Paris la Défense (FR)

(72) Inventors: Irène Mozo, Paris (FR); Marc Caligaris, Triel sur Seine (FR)

(73) Assignee: SUEZ GROUPE, Paris la Défense (FR)

(*) Notice: Subject to any disclaimer, the term of this patent is extended or adjusted under 35 U.S.C. 154(b) by 0 days.

(21) Appl. No.: 16/497,270

(22) PCT Filed: Mar. 30, 2018

(86) PCT No.: PCT/EP2018/058360
§ 371 (c)(1),
(2) Date: Sep. 24, 2019

(87) PCT Pub. No.: WO2018/178373
PCT Pub. Date: Oct. 4, 2018

(65) Prior Publication Data
US 2020/0377396 A1 Dec. 3, 2020

(30) Foreign Application Priority Data
Mar. 30, 2017 (FR) .................................... 1752662

(51) Int. Cl.
*C02F 3/00* (2006.01)
*C02F 3/12* (2006.01)
(Continued)

(52) U.S. Cl.
CPC ............... *C02F 3/006* (2013.01); *C02F 3/12* (2013.01); *C02F 3/302* (2013.01);
(Continued)

(58) Field of Classification Search
CPC .. C02F 3/302; C02F 3/006; C02F 3/30; C02F 3/12; C02F 2209/006; C02F 2101/16;
(Continued)

(56) References Cited

U.S. PATENT DOCUMENTS

| 5,976,888 A | 11/1999 | Lee et al. |
| 6,254,778 B1 * | 7/2001 | Chudoba ............... C02F 3/30 |
| | | 210/614 |

(Continued)

FOREIGN PATENT DOCUMENTS

| EP | 0 925 258 B1 | 1/2001 |
| EP | 1 144 318 A1 | 10/2001 |

(Continued)

OTHER PUBLICATIONS

Balmer et al., FR 2955856, English machine translation, pp. 1-10 (Year: 2011).*

*Primary Examiner* — Claire A Norris
(74) *Attorney, Agent, or Firm* — BakerHostetler

(57) ABSTRACT

In the field of wastewater or effluent treatment, a method for treating wastewater includes a first step of treating carbon contained in the wastewater by means of oxygen, a second step of treating the nitrogen contained in the treated water at the end of the first step, a third step of determining a ratio between a concentration of carbon and a concentration of nitrogen in the water at the end of the first step, a fourth step of controlling the supply of oxygen necessary for the first step as a function of a difference between the determination carried out in the third step and a strictly positive setpoint of concentration ratio. A device implementing the method is also provided.

18 Claims, 2 Drawing Sheets

(51) Int. Cl.
*C02F 3/30* (2006.01)
*C02F 101/16* (2006.01)
*C02F 101/30* (2006.01)

(52) U.S. Cl.
CPC ...... *C02F 2101/16* (2013.01); *C02F 2101/30* (2013.01); *C02F 2209/003* (2013.01); *C02F 2209/08* (2013.01); *C02F 2209/14* (2013.01); *C02F 2209/20* (2013.01); *C02F 2209/22* (2013.01); *C02F 2209/40* (2013.01)

(58) Field of Classification Search
CPC .......... C02F 2101/163; C02F 2101/166; C02F 2209/08; C02F 3/303; C02F 3/305
USPC .......................................... 210/614, 630, 739
See application file for complete search history.

(56) References Cited

U.S. PATENT DOCUMENTS

| | | | |
|---|---|---|---|
| 2010/0096339 A1* | 4/2010 | Newcombe | C02F 3/2833 210/744 |
| 2013/0327710 A1* | 12/2013 | Reid | C02F 3/286 210/607 |
| 2015/0266759 A1 | 9/2015 | Morgan | |

FOREIGN PATENT DOCUMENTS

| | | |
|---|---|---|
| FR | 2 400 489 A1 | 3/1979 |
| FR | 2 955 856 A1 | 8/2011 |
| WO | 00/39034 A1 | 7/2000 |

* cited by examiner

METHOD AND DEVICE FOR TREATING WASTEWATER

CROSS-REFERENCE TO RELATED APPLICATIONS

This application is a National Stage of International patent application PCT/EP2018/058360, filed on Mar. 30, 2018, which claims priority to foreign French patent application No. FR 1752662, filed on Mar. 30, 2017, the disclosures of which are incorporated by reference in their entirety.

FIELD OF THE INVENTION

Context of the Invention

The invention relates to the field of wastewater or effluent treatment. The invention is especially directed toward the treatment and recovery of carbon-based and nitrogen-based pollution in wastewater. The invention lies in a two-step treatment, a first step of treating the carbon contained in the water by means of oxygen and a second step of treating the nitrogen contained in the treated water at the end of the first step.

BACKGROUND

With the increase in the worldwide population the consumption of water is increasing. Growing urbanization creates new modes of production and of human consumption and it becomes essential to treat the wastewater resulting from domestic and industrial consumption before sending it into the natural environment, in the interests of preserving the environment. Moreover, in most countries the legislation imposes such treatments.

Conventionally, wastewater treatment plants are mainly designed to remove carbon, nitrogen and phosphorus by means of biological processes using specific bacteria.

For example, in an activated sludge system, the organic matter contained in the wastewater is removed during a bio-oxidation process wherein the organic matter is an electron donor whereas the oxygen is an electron acceptor. Bacteria are responsible for the catalysis of the reaction. An example of a bio-oxidation reaction can be expressed in the following way:

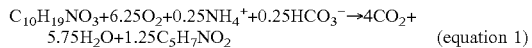

$$C_{10}H_{19}NO_3 + 6.25O_2 + 0.25NH_4^+ + 0.25HCO_3^- \rightarrow 4CO_2 + 5.75H_2O + 1.25C_5H_7NO_2 \quad \text{(equation 1)}$$

$C_{10}H_{19}NO_3$ represents the organic matter mainly present in wastewater and that it is desired to remove; $C_5H_7NO_2$ represents the biomass.

For a given reaction, a sufficient amount of oxygen must be supplied for treating the organic matter. Moreover, it is sought to reduce as much as possible the energy consumption required for the reduction and the supply of air providing oxygen. To do this, it has been attempted to use a measurement of the chemical oxygen demand, often referred to as COD, in the effluent in order to control the flow rate of air entering the activated sludge system.

This system treats both the carbon and in part the nitrogen contained in wastewater. It is also known to add thereto a nitrogen treatment. A first step, sometimes referred to a step A, of treating essentially the organic matter by means of oxygen, is followed by a second step, sometimes referred to a step B, of treating the nitrogen at the end of step A.

In the first step of treating the organic matter, it has always been sought to optimize this treatment as much as possible, by providing said treatment with as much oxygen as necessary to treat the maximum amount of organic matter.

The treatment of nitrogen generally calls upon nitrification followed by denitrification. Nitrification is a reaction of oxidation, by autotropic bacteria, of ammoniacal nitrogen to nitrous or nitric nitrogen. Denitrification is a reduction of nitrogen gas, by denitrifying heterotrophic bacteria, of the nitrites or nitrates produced during nitrification reactions. Examples of nitrogen treatments by nitrification and denitrification are given in documents EP 0 925 258 A1, US 2015/0266759 A1 and EP 1 144 318 A1.

Several methods which call upon nitrification/denitrification have been developed. For example, a method referred to as "shunt of nitrates" seeks to stop the oxidation of nitrogen at the nitrite ($NO_2^-$) stage, avoiding nitric production. This method makes it possible to reduce the amounts of oxygen and carbon required for nitrification and denitrification. In another method, referred to as deammonification, nitrification may be partial. This method can have the name "Anammox" which is an abbreviation of its name "anaerobic ammonium oxidation".

Generally in methods for treating nitrogen, the supply of oxygen is also important and can be based on measurements carried out using nitrite $NO_2^-$ sensors or on the ammonia $NH_4^-$ load content.

For the treatment of nitrogen, the ratio between the carbon concentration and the ammoniacal nitrogen concentration is important. In methods of shunt of nitrates or Anammox type, this ratio makes it possible to manage the amount of autotrophic bacteria.

At the current time, the sequence of the two treatments A and B: organic matter and nitrogen, is not optimized. In the known methods, the two treatments are optimized separately. In attempting to treat the maximum amount of organic matter during step A, step B may be deprived of the carbon required, in particular for the autotrophic bacteria.

SUMMARY OF THE INVENTION

The invention aims to improve the efficiency of the sequence of these two treatments by regulating the provision of oxygen of the first step with a view to the carbon required necessary for treating the nitrogen during the second step. In the overall regulation of the sequence of the two treatments, carbon then nitrogen, the method of the invention accepts degrading the carbon treatment carried out during the first step in order to preserve an amount thereof that is sufficient to carry out the nitrogen treatment during the second step.

To this effect, a subject of the invention is a method for treating wastewater comprising:
  a first step of treating carbon contained in the wastewater by means of oxygen, carried out in a first reactor,
  a second step of removing nitrogen contained in the treated water in the form of nitrogen gas, distinct from the first step and carried out at the end of the first step in a second reactor distinct from the first reactor,
characterized in that it also comprises:
  a third step of determining a quantity representative of a ratio between a concentration of carbon and a concentration of nitrogen in the water between the first step and the second step,
  a fourth step of controlling the supply of oxygen necessary for the first step so as to minimize a difference between the determination carried out in the third step and a strictly positive setpoint of quantity representative of the concentration ratio.

The optimization of the supply of oxygen during the first step has many advantages. It allows maximum carbon recovery in the first step while at the same time preserving a sufficient amount for the second step. It makes it possible to reduce the energy necessary for the supply of oxygen. It makes it possible to optimize as much as possible the second step in terms of quality of the effluents exiting.

Advantageously, during the fourth step, an amount of oxygen supplying the first reactor increases when the quantity representative of a concentration ratio determined in the third step is greater than the setpoint of quantity representative of the concentration ratio. An increase in the amount of oxygen supplying the first step tends to treat more carbon during this first step and thus to reduce the concentration ratio determined during the third step.

For the representative quantity, the concentration of carbon, expressed in mg/l, can be derived from a measurement of chemical oxygen demand (COD) and the concentration of nitrogen, expressed in mg/l, can be a concentration of $N-NH_4^+$. The setpoint of quantity representative of the concentration ratio is then advantageously between 1 and 10. This setpoint is strictly positive in order to preserve a portion of non-treated carbon at the end of the first step. So as not to risk a lack of carbon for the nitrogen treatment of the second step, a minimum setpoint of greater than 1 is preserved. Moreover, the maximum setpoint value depends on the nitrogen treatment means used during the second step. Internal tests have shown that a setpoint less than 10 makes it possible to treat the nitrogen during the second step without risking preserving non-treated carbon at the end of the two steps. The setpoint can be chosen as a function of the nature of the nitrogen treatment during the second step.

The method advantageous also comprises:
- a fifth step of determining a quantity representative of the concentration of nitrogen in the water at the end of the second step,
- a sixth step of modifying the setpoint of quantity representative of the concentration ratio so as to minimize the difference between the determination carried out in the fifth step and a setpoint of quantity representative of the concentration of nitrogen in the water at the end of the second step.

The variation in setpoint makes it possible to adjust the ratio between a concentration of carbon and a concentration of nitrogen in the water at the end of the first step to the reality of the treatment carried out during the second step.

It is possible to replace the sixth step with a seventh step of controlling the supply of oxygen necessary for the first step so as to minimize a difference between the determination carried out in the fifth step and a setpoint of quantity representative of the concentration of nitrogen in the water at the end of the second step. This seventh step is carried out in addition to the fourth step.

The method can also comprise an eighth step of initializing the supply of oxygen used during the first step to a given value, as a function of one or more variables, at least one of which is among:
- a measurement of flow rate of wastewater supplying the first step,
- a measurement of chemical oxygen demand or of total organic carbon in the wastewater supplying the first step,
- a measurement of dissolved oxygen in the water during the first step,
- the quantity representative of the concentration ratio determined in the third step.

The initialization can of course be carried out at the beginning of the method. The initialization is also of value during the method in order to avoid any variations in supply of the first step with wastewater disrupting the method as a whole. In other words, the initialization makes the method more robust in the face of surges in the supply of wastewater. The different variables used for the initialization make it possible to protect against physical variations of the wastewater, in particular its flow rate and also variations in its composition, both before and after the first step.

Advantageously, the method also comprises a ninth step defining a lower limit of the amount of oxygen used during the first step, the lower limit depending on a measurement of dissolved oxygen in the water during the first step. The limit determination is of value for limiting the amplitude of the adjustment of the amount of oxygen necessary for the first step and in particular avoiding completely stopping the supply of oxygen.

A subject of the invention is also a device for treating wastewater comprising:
- a first reactor for treating carbon, supplied with wastewater,
- means for supplying the first reactor with oxygen, the oxygen serving in particular to treat the carbon in the first reactor,
- a second reactor for removing nitrogen contained in the wastewater in the form of nitrogen gas, taking the water at the outlet of the first reactor, the second reactor being distinct from the first reactor, characterized in that it also comprises:
- means for determining a quantity representative of a ratio between a concentration of carbon and a concentration of nitrogen in the water between the first reactor and the second reactor,
- a first feedback loop configured for modifying an amount of oxygen introduced into the first reactor by the means for supplying the first reactor with oxygen, so as to minimize a difference between, on the one hand, the representative quantity derived from the determining means and, on the other hand, a strictly positive setpoint of quantity representative of the concentration ratio.

The use of two reactors, the first dedicated to the first step and the second dedicated to the second step of the method of the invention, makes it possible to carry out a complete (carbon and nitrogen) treatment of the wastewater continuously.

The setpoint of quantity representative of the concentration ratio can be fixed. Alternatively, the device comprises means for adjusting the setpoint of quantity representative of the concentration ratio in order to better adapt the device to the treatment of the wastewater, the composition of which can vary. The adjusting means can be controlled by an operator or can be automated as a function of one or more parameters measured in the device.

The means for determining a concentration ratio can for example comprise at least one sensor and/or an analyzer for determining a chemical oxygen demand and a concentration of ammonium. The chemical oxygen demand gives a good picture of the concentration carbon. Moreover, the nitrogen to be treated in the wastewater is mainly present in the form of ammonium ions, hence the value of determining the concentration of ammonium.

The device advantageously also comprises:
- a sensor for measuring dissolved oxygen in the first reactor, and means for defining a lower limit of amount of oxygen introduced into the first reactor, the lower limit depending on a measurement carried out by the sensor for measuring dissolved oxygen in the first reactor.

Advantageously, the device also comprises: means for determining a quantity representative of the concentration of nitrogen in the water at the outlet of the second reactor. Depending on the quantity representative of the concentration of nitrogen determined, the device can comprise either a second feedback loop configured for modifying the setpoint of quantity representative of the concentration ratio or a third feedback loop configured for modifying an amount of oxygen of the first reactor. The second loop and the third loop are configured so as to minimize a difference between the quantity representative of the concentration of nitrogen in the water at the outlet of the second reactor and a setpoint of quantity representative of the concentration of nitrogen in the water at the outlet of the second reactor.

Advantageously, the device also comprises means for initializing the amount of oxygen introduced into the first reactor to a given value, as a function of one or more measurements or determinations carried out by at least one among:
- a sensor of flow rate of wastewater supplying the first reactor,
- a sensor or an analyzer of chemical oxygen demand or of total organic carbon in the wastewater supplying the first reactor,
- a sensor of dissolved oxygen in the water of the first reactor,
- means for determining a quantity representative of a ratio between a concentration of carbon and a concentration of nitrogen in the water at the outlet of the first reactor.

Advantageously, the means for supplying the first reactor with oxygen comprise means for supplying with air. Indeed, air typically comprises about 20% oxygen. Supplying the first reactor with air is easy to carry out.

BRIEF DESCRIPTION OF THE DRAWINGS

The invention will be understood more clearly and other advantages will emerge on reading the detailed description of an embodiment given by way of example, said description being illustrated by the appended drawing wherein.

In the interests of clarity, the same elements will carry the same references in the different figures.

DETAILED DESCRIPTION

Figure 1:
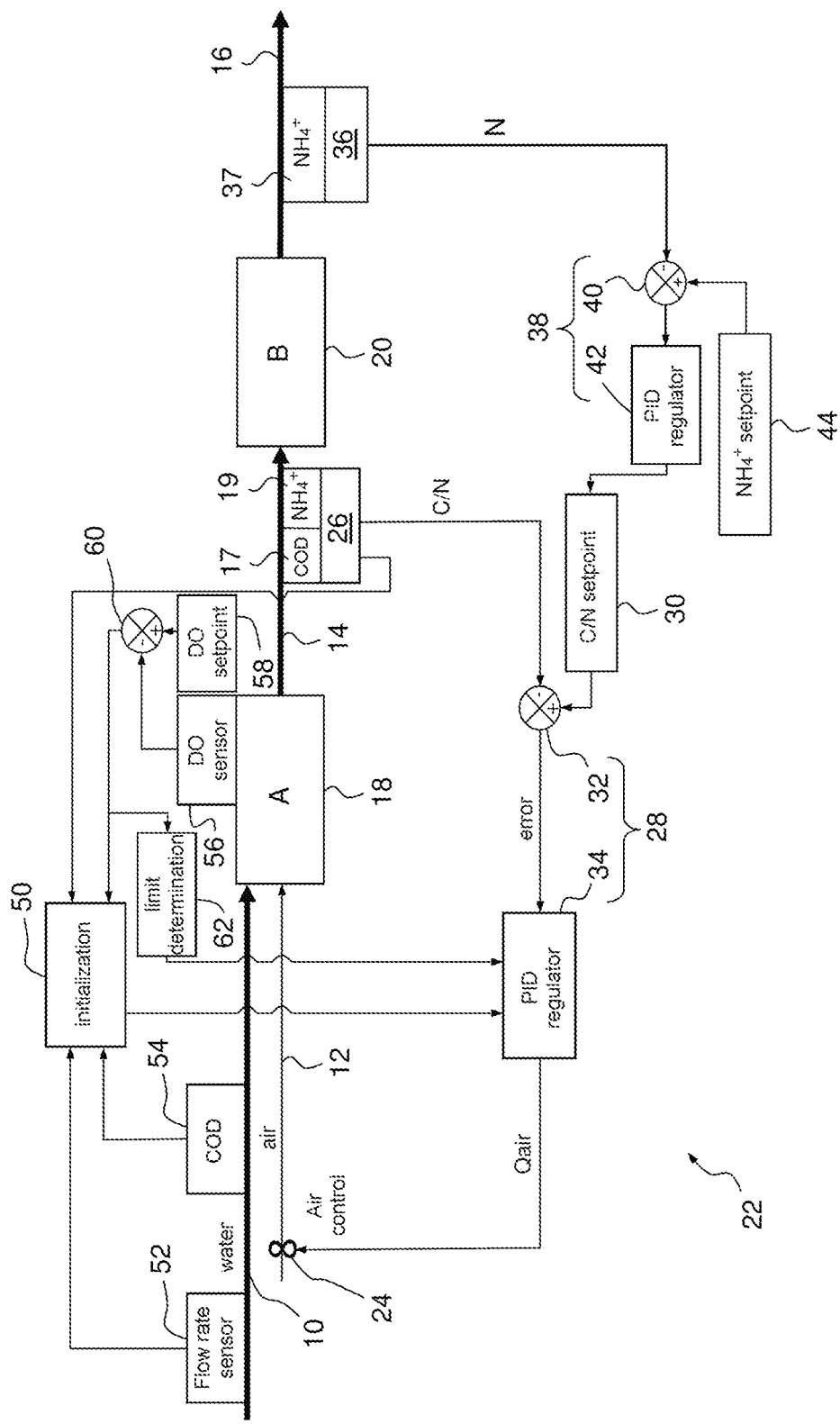
FIG. 1 represents, in the form of a block diagram, a first embodiment of the invention.

FIG. 1 represents, in the form of a block diagram, a method and a device according to the invention, suitable for treating wastewater 10. The term "wastewater" is intended to mean any type of municipal, industrial or domestic effluent wherein it is desired to treat a carbon-based and a nitrogen-based pollution. The wastewater is treated in two successive steps, denoted A and B. During step A, the carbon, contained in the wastewater 10 in the form of organic matter, is treated by means of oxygen 12. The water 14, resulting from the treatment of A, is in turn treated during step B, in order to partially or totally remove therefrom the nitrogen which is contained therein. In wastewater, carbon is mainly present in the form of organic matter and nitrogen is mainly present in the form of ammonium $NH_4^+$.

At the end of step B, the treated water carries the reference 16. A maximum concentration of ammonium present in the water at the outlet of step B can be imposed by standards or by other treatments carried out downstream of step B. The objective of step B is to provide treated water 16 containing a concentration of ammonium, or more generally of nitrogen present in the water, lower than the maximum authorized concentration. The removal of the nitrogen is carried out by producing nitrogen gas which can escape freely into the ambient air.

Steps A and B are carried out in two distinct reactors 18 and 20 wherein the two steps A and B are respectively carried out. The reactors 18 and 20 may be closed tanks or open ponds.

Step B can call upon a method in two substeps: nitritation and/or nitrification wherein the ammonium is oxidized to nitrites and/or to nitrates, followed by denitritation and/or denitrification wherein the nitrites and/or nitrates are reduced to form nitrogen gas. The two substeps of nitritation and/or nitrification and of denitritation and/or denitrification can be carried out in a single reactor or in two separate reactors. For the requirement of the invention, the reactor(s) wherein step B is carried out are distinct from the reactor 18. So as not to overburden the description, the reactor(s) wherein step B is carried out carry the reference 20.

The device 22 wherein the two steps A and B are carried out comprises means for supplying 24 the reactor 18 with oxygen 12. The oxygen 12 can be provided in pure form. Advantageously, the oxygen is provided in the form of air which, typically, comprises about 20% oxygen. The supplying means 24 can be formed of a fan or a pump introducing air into the reactor 18. In order to improve the efficiency of the carbon bio-oxidation reaction in the first reactor 18, it is possible to stir the water and air therein. Bacteria are responsible for the catalysis of the bio-oxidation reaction. In the reactor 18, the organic matter is oxidized mainly to biomass which can be removed or recovered in order to be exploited. It is for example possible to carry out a method of activated sludge type.

According to the invention, during a step 26, a quantity representative of a ratio between a concentration of carbon and a concentration of nitrogen in the water 14 at the end of the first step A and before beginning step B is determined. This ratio is subsequently denoted C/N. This determination can be carried out by means of two sensors, one for measuring the concentration of carbon and the other for measuring the concentration of ammonium at the outlet of the reactor 18 in the water 14. Alternatively, it is possible to carry out just one measurement from which the C/N concentration ratio is determined. It is for example possible to use a sensor for measuring ultraviolet radiation transmission. Carbon-specific and nitrogen-specific lines are analyzed and their intensity makes it possible to define the concentration of carbon and the concentration of nitrogen in the water 14, then to determine the C/N concentration ratio.

To measure the concentration of carbon in the water 14, it is possible to use a sensor for measuring, or an analyzer 17 of, the chemical oxygen demand (COD) in the water 14, which makes it possible to find it in the concentration of carbon. It is also possible to measure the biological oxygen demand (BOD) or the total organic carbon (TOC). Certain measurements, such as the chemical oxygen demand, are sometimes the subject of debate in the literature. However, as will subsequently be seen, the carbon concentration measurement is used in a feedback loop. Consequently, even if the measurement is marred by error, it nevertheless makes it possible to perform the expected feedback.

In order to measure the concentration of ammonium, it is possible to use an ammonium sensor or analyzer 19 such as, for example, an ion selective electrode known in the literature by its initials ISE. By means of the measurements obtained using the two sensors or analyzers, it is easy to determine the C/N concentration ratio by dividing the value of the measurement carried out by the sensor or analyzer 17 by that obtained by the sensor analyzer 19.

Furthermore, during a step 28, the supply of oxygen required for step A is controlled so as to minimize a difference between the quantity representative of the concentration ratio determined in step 26 and a strictly positive setpoint 30. The setpoint 30 is itself also a quantity representative of a setpoint C/N ratio. The value of the setpoint 30 makes it possible to not treat a portion of the carbon during step A and to conserve this portion of carbon for the requirements of step B.

Step 28 can be carried out by means of a comparator 32 and a regulator 34. The comparator 32 receives the value of the quantity representative of the C/N ratio determined in step 26 and the setpoint 30. The comparator 32 calculates a difference between the value of the quantity representative of the C/N ratio and the setpoint 30 which it transmits to the regulator 34 which in turn controls the means for supplying with oxygen 24. The regulator 34 may be a regulator of Proportional-Integral-Derivative type. The various coefficients of the regulator can be adjusted empirically during the overall implementation of the method according to the invention. The various coefficients in particular take into account possible changes in concentration of organic matter and of nitrogen in the wastewater 10.

The determination of the quantity representative of the C/N concentration ratio, the comparator 32 and the regulator 34 can be implemented by means of discrete electronic components or by means of a dedicated or generic computer programmed for this purpose. The setpoint 30 can be stored in the computer.

The sensor(s) used in step 26, and the components or the computer used for steps 26 and 28 form a first feedback loop configured for modifying an amount of oxygen Qair introduced into the reactor 18. More specifically, the first feedback loop is configured for increasing an amount of oxygen supplying the reactor 18 when the quantity representative of the C/N concentration ratio determined at the outlet of the reactor 18 is greater than the setpoint 30 of quantity representative of the concentration ratio.

The value of the setpoint 30 can be fixed and predefined as a function of the type of treatment carried out in step B. It was seen above that the quantity representative of the C/N ratio may be marred by error. In order to refine the feedback, it is possible to modify the setpoint 30 empirically in order to compensate for the possible error in the measurement for determining the C/N ratio.

The concentration of carbon can be expressed in mg/l and can be derived from a measurement of chemical oxygen demand COD and the concentration of nitrogen, also expressed in mg/l, can be a concentration of $N-NH_4^+$. In other words, the concentration of nitrogen is a concentration of ammonium ion expressed by weight of nitrogen per unit volume. With parameters thus defined, high C/N ratios of about 5 to 10 are advantageous when, for step B, complete nitrification followed by denitrification are carried out or even for the shunt of nitrates.

In the case of a deammonification carried out in step B, a lower C/N ratio is advantageous in order to manage the growth of heterotrophic bacteria which compete with the oxidizing anaerobic bacteria. A C/N ratio in the range of 6 to 10 leads to a predominance of heterotrophic bacteria. A C/N ratio in the range of 1 to 3 leads to a predominance of anaerobic bacteria and a C/N ratio in the range 3 to 5 leads to an intermediate situation. More generally, the concentration ratio setpoint 30 is advantageously between 1 and 10.

Alternatively, it is possible to vary the C/N concentration ratio setpoint 30. Adjustment means are provided for this purpose. The adjustment of the setpoint 30 can be carried out by a user manually. The adjustment of the setpoint can also be carried out automatically and depending on a parameter measured in the device 22. Advantageously, the setpoint 30 depends on the result of step B. More specifically, during a step 36, a quantity representative of the concentration of nitrogen in the water 16 at the end of step B is determined and, during step 38, the setpoint 30 is modified so as to minimize a difference between the quantity representative of the concentration of nitrogen determined in step 36 and a setpoint 44 of quantity representative of the concentration of nitrogen in the water at the end of step B. The variation in the setpoint 30 makes it possible to better adjust the C/N ratio to the reality of the treatment carried out during step B.

Step 36 can be carried out by means of a sensor 37 of concentration of nitrogen present in the water and the value determined may be the value measured by this sensor. As previously, this sensor may be an ion-selective electrode for measuring the concentration of ammonium. It is also possible to insert a computer which performs corrections to a value measured by the sensor.

Step 38 can be carried out by means of a comparator 40 and a regulator 42. The comparator 40 receives the value of concentration of nitrogen in the water 16 determined in step 36 and the setpoint 44 of concentration of nitrogen, for example in the form of ammonium in the water 16. The sensor 37, the comparator 40 and the regulator 42 form an example of means for adjusting the setpoint 30.

The comparator 40 calculates a difference between the value of concentration of nitrogen determined in step 36 and the setpoint 44 which it transmits to the regulator 42 which in turn varies the C/N concentration ratio setpoint 30. As for the regulator 34, the regulator 42 may be a regulator of Proportional-Integral-Derivative type. The various coefficients of the regulator can be adjusted empirically during the overall implementation of the method according to the invention. These coefficients take into account for example the reaction time of the regulator 42 compared with that of the regulator 34.

The determination of the concentration of nitrogen carried out in step 36, the comparator 40 and the regulator 42 can be implemented by means of discreet electronic components or by means of a dedicated or generic computer programmed for this purpose. This computer may be the one already used for steps 26 and 28. The setpoint 44 can be stored in the computer.

The sensor used in step 36, the components or the computer used for step 38 form a second feedback loop configured for modifying the C/N concentration ratio setpoint 30 as a function of the concentration of nitrogen in the water at the outlet of the second reactor 20.

At the beginning of the method or during the method, it is advantageous to carry out a step for initializing 50 the supply of oxygen used during step A. During the method, this initializing is of particular advantage when irregularities in the supply of wastewater 10 appear before step A. These irregularities can involve the flowrate of wastewater, its composition, or even the conditions of the environment: temperature and pressure. Still during the method, it may be advantageous to initialize the supply of oxygen as a function of variables which intervene in the reactor 18 or even at the outlet of the reactor. For example, if the C/N concentration determined in step 26 begins to diverge, it is advantageous to initialize the supply of oxygen to a given value, for example by adjusting the supply of oxygen at a given flow rate of oxygen.

The initializing of the supply of oxygen can be carried out as a function of one or more variables, at least one of which is among:

- a measurement of flow rate of wastewater 10 supplying step A,
- a measurement of chemical oxygen demand (COD) or of total organic carbon (TOC) in the wastewater 10 supplying step A,
- a measurement of dissolved oxygen (DO) in the water during step A,
- the quantity representative of the C/N concentration ratio determined in step 26.

For each of these variables, the supply of oxygen can be initialized to an amount or a flow rate that is predetermined. A table which contains as many entries as variables can predefine the supply of oxygen as a function of the value of each of the values retained. This table can be defined empirically on the basis of tests carried out on the method in particular, by testing various surges in concentration of matter in the wastewater entering step A.

The measurement of flow rate of wastewater 10 supplying step A can be carried out by means of a flow meter 52 placed in a pipe supplying the reactor 18 with wastewater 10. The measurement of chemical oxygen demand COD can also be carried out in the pipe supplying the reactor 18 with wastewater 10 by means of an appropriate sensor 54. The measurement of COD may be imprecise and a measurement of total organic carbon TOC, which is easier to carry out in real time, may be preferred to the measurement of COD. The measurement of dissolved oxygen DO in the water during step A is carried out by means of a sensor 56 placed in the reactor 18. The sensor 56 can use an electrode and can carry out a measurement of electrochemical type. Alternatively, there are also optical probes which carry out a measurement by fluorescence. With regard to the value of dissolved oxygen DO used for the initialization, it is possible to vary an expected value 58 of dissolved oxygen DO and to compare the measured value of dissolved oxygen with the expected value in order to decide whether or not to initialize the supply of oxygen. A comparator 60 is envisioned for this purpose.

The step of initialization 50 of the supply of oxygen can be carried out by means of discreet electronic components or by means of a dedicated or generic computer programmed for this purpose. This computer may be the one already used for steps 26 and 28. The setpoint 58 can be stored in the computer.

During the method, it is advantageous to carry out a step 62 defining a lower limit of the amount of oxygen used during step A in order to avoid the regulator 34 coming to completely stop the supply of oxygen. The lower limit can be defined and fixed in advance independently of any parameter. The value of the lower limit can be determined empirically on the basis of tests carried out on the method in particular, by testing various concentrations of matter in the wastewater entering step A. Alternatively, the value of the lower limit can be variable and adjusted depending on measurements carried out in the device 22. Advantageously, the lower limit depends on a measurement of dissolved oxygen DO in the water during step A. Indeed, if the dissolved oxygen increases in the reactor 18, it is possible to reduce the value of the lower limit. The function linking the lower limit and the measurement of dissolved oxygen can be established empirically, for example so that the result of the treatment remains optimal, in particular so that the concentration of nitrogen in the water at the outlet of the second reactor 20 remains within the desired tolerances, for example by means of a standard.

Here again, step 62 defining a lower limit of the amount of oxygen can be carried out by means of discreet electronic components or by means of a dedicated or generic computer programmed for this purpose. This computer may be the one already used for steps 26 and 28.

Figure 2:
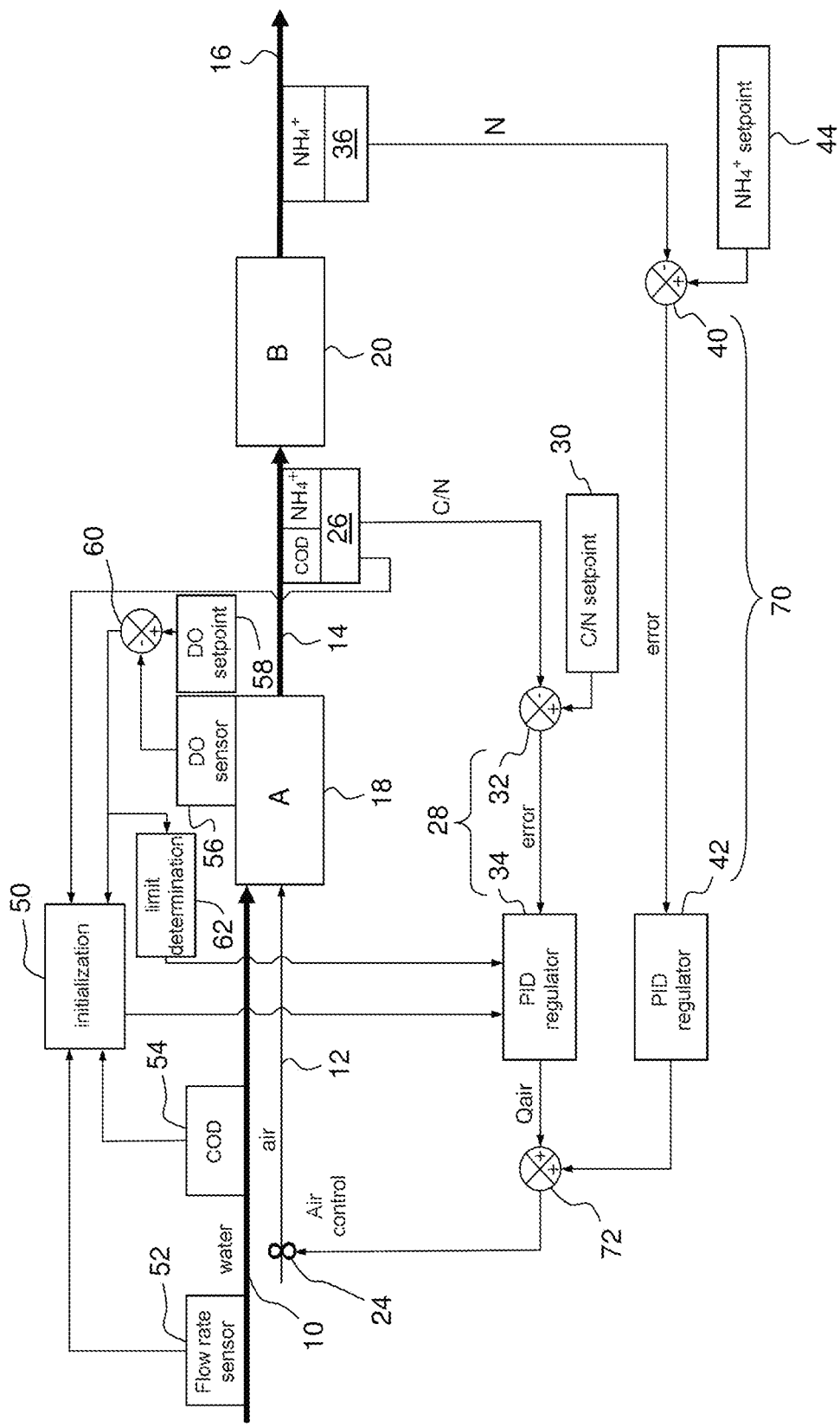
FIG. 2 represents, in the form of a block diagram, a second embodiment of the invention.

FIG. 2 represents a second embodiment of the invention. These two steps A and B which are linked together for treating the wastewater 10 are found again in FIG. 2. Steps 28 and 26 which ensure the control of the supply of oxygen of step A as a function of the C/N ratio are also found again. The initializing step 50 and the limit determination step 62 are also found again.

Unlike the embodiment described by means of FIG. 1, in the embodiment of FIG. 2, the setpoint 30 of quantity representative of the C/N concentration ratio remains fixed and step 36 of determining the concentration of nitrogen in the water 16 at the end of step B is not used for modifying the setpoint 30. In the embodiment of FIG. 2, during a step 70, the supply of oxygen required for step A is modified as a function of the concentration of nitrogen determining step 36. This adjustment of the supply of oxygen is carried out in addition to that carried out in step 28. More specifically, it is sought here to minimize a difference between the determination carried out in step 36 and the setpoint 44.

The comparator 40 and the regulator 42 are here used to carry out step 70. An operator 72, for example a summer, makes it possible to couple the outputs of the regulators 34 and 42 in order to control the supply means 24.

The sensor used in step 36 and the components or the computer used for step 70 form a third feedback loop configured for modifying an amount of oxygen Qair introduced into the reactor 18 in addition to the first feedback loop.

The invention claimed is:

1. A method for treating wastewater comprising:
   a first step (A) of treating carbon contained in the wastewater with oxygen provided by an oxygen supplier, carried out in a first reactor;
   a second step (B) of removing nitrogen contained in a water treated in the first step by reducing the nitrogen contained in the water treated in the first step nitrogen gas, distinct from the first step and carried out at the end of the first step (A) in a second reactor distinct from the first reactor;
   a third step of directly or indirectly determining a C/N ratio between a concentration of carbon and a concentration of nitrogen in water between the first step (A) and the second step (B) and between the first reactor and the second reactor; and
   a fourth step of controlling the oxygen supplier using a comparator and an regulator, the comparator receiving the C/N ratio and a C/N ratio setpoint and delivering a difference between the C/N ratio and the C/N ratio setpoint to the regulator, the regulator controlling the oxygen supplier so as to minimize a difference between the C/N ratio and the C/N ratio setpoint, the C/N ratio setpoint being strictly positive to obtain the partial treating carbon of the first step (A).

2. The method claimed in claim 1, wherein during the fourth step, an amount of oxygen supplying the first reactor increases when the C/N ratio determined in the third step is greater than the C/N ratio setpoint.

3. The method as claimed in claim 1, wherein the C/N ratio setpoint is between 1:1 and 10:1 and wherein the method further comprises measuring chemical oxygen demand (COD) and measuring a concentration of $N-NH_4^+$.

4. The method as claimed in claim 1 further comprising:
a fifth step of determining a concentration of nitrogen in the water at the end of the second step (B),
a sixth step of modifying the C/N ratio setpoint so as to minimize a difference between the determination carried out in the fifth step and a nitrogen concentration setpoint in the water at the end of the second step (B).

5. The method as claimed in claim 4 further comprising:
a seventh step of further controlling the supply of oxygen necessary for the first step (A) based on the C/N ratio so as to minimize a difference between the determination carried out in the fifth step and a nitrogen concentration setpoint in the water at the end of the second step (B).

6. The method as claimed in claim 5, further comprising initializing the supply of oxygen as a function of one or of the following:
a measurement of flow rate of wastewater supplying the first step (A),
a measurement of chemical oxygen demand (COD) or of total organic carbon (TOC) in the wastewater supplying the first step (A),
a measurement of dissolved oxygen (DO) in the water during the first step (A), and
the C/N ratio determined in the third step.

7. The method as claimed in claim 1, further comprising a ninth step defining a lower limit of the amount of oxygen (Qair) introduced into reactor in the first step (A), the lower limit depending on a measurement of dissolved oxygen (DO) in the water during the first step (A).

8. The method as claimed in claim 1, wherein method further comprises determining the concentration of carbon, expressed in mg/l, based on measuring total organic carbon (TOC).

9. A device for treating wastewater comprising:
a first reactor for treating carbon, supplied with wastewater;
an oxygen supplier for the first reactor, the oxygen provided by the oxygen supplier serving in particular to the treating of the carbon in the first reactor;
a second reactor taking water at the outlet of the first reactor, the reactor removing nitrogen by reducing the nitrogen contained in water of the second reactor to be reduced to nitrogen gas, the second reactor being distinct from the first reactor;
a first sensor for directly or indirectly measuring a concentration of carbon at an outlet of the first reactor;
a second sensor for measuring a concentration of nitrogen at the outlet of the first reactor;
means for directly or indirectly determining a C/N ratio between the concentration of carbon and the concentration of nitrogen in the water between the first reactor and the second reactor; and
a first feedback loop comprising a comparator and a regulator configured for controlling the first feedback loop, the first feedback loop for modifying an amount of oxygen (Qair) introduced into the first reactor by the oxygen supplier based on the determined C/N ratio, so as to minimize a difference between the C/N ratio and a C/N ratio setpoint strictly positive to obtain the partial treating carbon of the first reactor, the comparator receiving the C/N ratio and the C/N ratio setpoint and delivering the difference between the C/N ratio and the C/N ratio setpoint to the regulator, the regulator being configured to control the oxygen supplier so as to minimize the difference between the determined C/N ratio and the C/N ratio setpoint.

10. The device as claimed in claim 9, further comprising a regulator configured to adjust the C/N ratio setpoint.

11. The device as claimed in claim 9, wherein the means for directly or indirectly determining a C/N ratio comprises an analyzer for determining a chemical oxygen demand and a concentration of ammonium.

12. The device as claimed in claim 9, further comprising:
a third sensor for measuring dissolved oxygen in the first reactor, and
an electronic component configured to determine a lower limit of quantity of oxygen introduced into the first reactor, the lower limit depending on a measurement carried out by the third sensor for measuring dissolved oxygen in the first reactor.

13. The device as claimed in claim 12, further comprising:
a fourth sensor for measuring the concentration of nitrogen in the water at an outlet of the second reactor, and
a second feedback loop comprising a regulator for controlling the second feedback loop and a comparator, the comparator configured for modifying the C/N setpoint so as to minimize a difference between the concentration of nitrogen in the water at the outlet of the second reactor and a concentration of nitrogen setpoint in the water at the outlet of the second reactor.

14. The device as claimed in claim 12, further comprising:
a fourth sensor for measuring the concentration of nitrogen in the water at an outlet of the second reactor, and
a third feedback loop configured for modifying an amount of oxygen (Qair) introduced into the first reactor so as to minimize a difference between the concentration of nitrogen in the water at the outlet of the second reactor and a concentration of nitrogen setpoint in the water at the outlet of the second reactor.

15. The device as claimed in claim 9, further comprising an electronic component configured to initialize the amount of oxygen introduced into the first reactor to a given value, as a function of one or more measurements or determinations carried out by at least one of the following:
a sensor of flow rate of wastewater supplying the first reactor,
a sensor or an analyzer of chemical oxygen demand or of total organic carbon in the wastewater supplying the first reactor,
a sensor of dissolved oxygen in the water of the first reactor, and
the means for directly or indirectly determining a C/N ratio between a concentration of carbon and a concentration of nitrogen in the water at the outlet of the first reactor.

16. The device as claimed in claim 9, wherein the oxygen supplier comprises an air supplier.

17. The device as claimed in claim 9, wherein the first sensor measures chemical oxygen demand (COD).

18. The device as claimed in claim 9, wherein the first sensor measures total organic carbon (TOC).

* * * * *